United States Patent
Hasegawa

(10) Patent No.: US 10,579,014 B2
(45) Date of Patent: Mar. 3, 2020

(54) IMAGE FORMING APPARATUS FOR REMOVING DEW CONDENSATION, CONTROL METHOD FOR IMAGE FORMING APPARATUS, AND STORAGE MEDIUM

(71) Applicant: CANON KABUSHIKI KAISHA, Tokyo (JP)

(72) Inventor: Kiichi Hasegawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/167,310

(22) Filed: Oct. 22, 2018

(65) Prior Publication Data

US 2019/0129358 A1 May 2, 2019

(30) Foreign Application Priority Data

Oct. 26, 2017 (JP) .................................. 2017-207441

(51) Int. Cl.
*G03G 21/20* (2006.01)
*G03G 15/00* (2006.01)
*H04N 1/00* (2006.01)

(52) U.S. Cl.
CPC ....... *G03G 21/203* (2013.01); *G03G 15/5016* (2013.01); *H04N 1/00992* (2013.01);
(Continued)

(58) Field of Classification Search
CPC ........... H04N 1/00992; H04N 1/00981; H04N 1/00986; H04N 1/00915–0096;
(Continued)

(56) References Cited

U.S. PATENT DOCUMENTS 9,661,174 B2 * 5/2017 Terada ............... H04N 1/00992
2010/0238485 A1 * 9/2010 Miyamoto .............. G06F 3/121
358/1.15

(Continued)

FOREIGN PATENT DOCUMENTS

CN 1892576 A 1/2007
CN 101840316 A 9/2010
(Continued)

OTHER PUBLICATIONS

English machine translation of JP-2016114865 to Terada et al. (Year: 2016).*

*Primary Examiner* — Walter L Lindsay, Jr.
*Assistant Examiner* — Arlene Heredia
(74) *Attorney, Agent, or Firm* — Canon U.S.A., Inc. IP Division

(57) ABSTRACT

An image forming apparatus includes a dew condensation removal unit configured to execute dew condensation removal processing if it is determined that dew condensation may have occurred in the image forming apparatus, a reception unit configured to receive a print job for instructing execution of print processing, a restriction unit configured to restrict the execution of the print processing during execution of the dew condensation removal processing, a display control unit configured to control a display unit to display a selection screen for selecting whether to execute or cancel the print processing based on the print job if the print job is received during the execution of the dew condensation removal processing, and a print control unit configured to control the print processing to be executed after completion of the dew condensation removal processing if the execution of the print processing is selected.

19 Claims, 14 Drawing Sheets

(52) U.S. Cl.
CPC ....... *G03G 21/206* (2013.01); *H04N 1/00981* (2013.01); *H04N 1/00986* (2013.01)

(58) Field of Classification Search
CPC .... G03G 21/20; G03G 21/203; G03G 21/206; G03G 15/5016
USPC ................................................ 399/44, 9, 81
See application file for complete search history.

(56) References Cited

U.S. PATENT DOCUMENTS

2012/0076561 A1    3/2012  Sato
2018/0164728 A1*   6/2018  Mandachi .............. B41J 29/377

FOREIGN PATENT DOCUMENTS

| CN | 106557287 A |   | 4/2017 |
|----|-------------|---|--------|
| JP | 2000-151866 A |   | 5/2000 |
| JP | 2012093718 A |   | 5/2012 |
| JP | 2016114865 A | * | 6/2016 |

* cited by examiner

IMAGE FORMING APPARATUS FOR REMOVING DEW CONDENSATION, CONTROL METHOD FOR IMAGE FORMING APPARATUS, AND STORAGE MEDIUM

BACKGROUND

Field

The present disclosure relates to a technique for restricting execution of a job during execution of dew condensation countermeasure processing.

Description of the Related Art

In an image forming apparatus, if a job is executed in a state where dew condensation has occurred in the image forming apparatus, a printing process for the job may fail. If the printing process fails, a user may not be able to check the content of received data since job data is generally deleted after printing.

In this regard, an image forming apparatus discussed in Japanese Patent Application Laid-Open No. 2012-93718 receives an instruction from a user and carries out a dew condensation removal operation. If a job is received during execution of the dew condensation removal operation, the dew condensation removal operation cannot be terminated according to normal processes. Therefore, print processing corresponding to the job is not carried out during the dew condensation removal operation.

A user may input a job even when the image forming apparatus is executing the dew condensation removal operation. According to the technique discussed in Japanese Patent Application Laid-Open No. 2012-93718, the job input during the dew condensation removal operation is not started until the dew condensation removal operation is completed, so that a downtime unintended by the user occurs.

SUMMARY OF THE INVENTION

According to various embodiments of the present disclosure, an image forming apparatus includes a dew condensation removal unit configured to execute dew condensation removal processing in a case where it is determined that dew condensation may have occurred in the image forming apparatus, a reception unit configured to receive a print job for instructing execution of print processing, a restriction unit configured to perform processing for restricting the execution of the print processing during the execution of the dew condensation removal processing, a display control unit configured to control a display unit to display a selection screen for selecting whether to execute or cancel the print processing based on the print job in a case where the print job is received during the execution of the dew condensation removal processing, and a print control unit configured to control the print processing to be executed after completion of the dew condensation removal processing in a case where the execution of the print processing is selected, and to control the print job to be cancelled in a case where the cancellation of the print processing is selected.

Further features will become apparent from the following description of exemplary embodiments with reference to the attached drawings.

DESCRIPTION OF THE EMBODIMENTS

Exemplary embodiments of the present disclosure will be described in detail below with reference to the drawings. The exemplary embodiments described below are not intended to limit the invention according to the claims, and not all combinations of features described in the exemplary embodiments are essential to various embodiments of the present disclosure.

Figure 1:
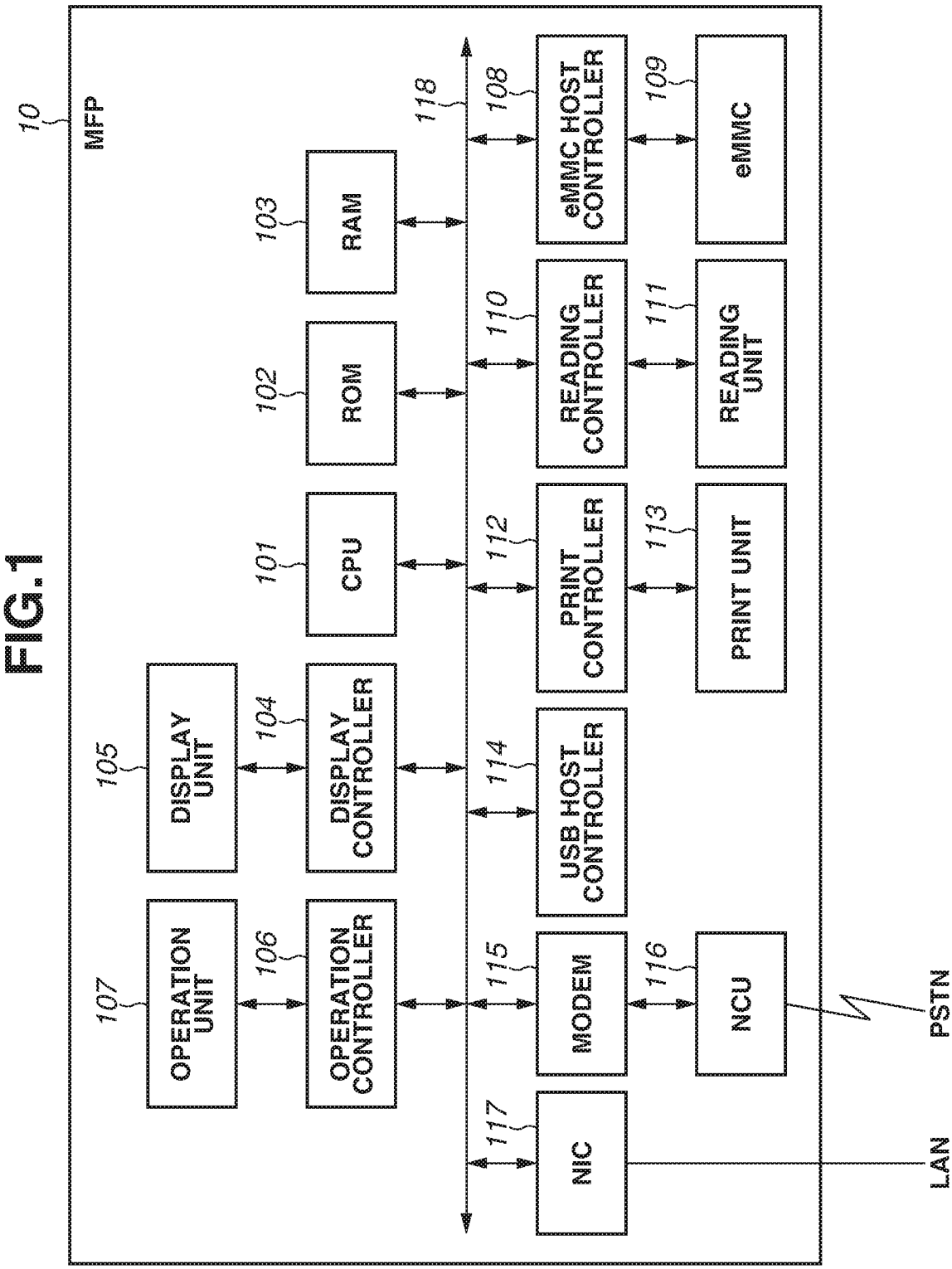
FIG. 1 is a block diagram illustrating a hardware configuration of a multifunction peripheral (MFP) according to a first exemplary embodiment.

A first exemplary embodiment will be described below. A hardware configuration of a multifunction peripheral (MFP) 10 according to the present exemplary embodiment will be described with reference to a block diagram of FIG. 1. The MFP 10 according to the present exemplary embodiment is an image forming apparatus having a print function and a facsimile (fax) function. However, various embodiments of the present disclosure can also be applied to a single function printer (SFP) having only a print function.

A central processing unit (CPU) 101 comprehensively controls devices connected to a system bus 118. When power is supplied, the CPU 101 executes a boot program stored in a read only memory (ROM) 102. The CPU 101 executes the boot program, thereby loading a main program stored in a storage into a random access memory (RAM)

103. The RAM 103 functions not only as a location where the main program is loaded into, but also as a work area for the main program.

A display controller 104 controls rendering on a display unit 105. An operation controller 106 controls an input from an operation unit 107 which is provided in the MFP 10. The operation unit 107 includes a numeric keypad, a cursor key, and a one-touch key.

A reading unit 111 reads a document. The reading unit 111 is connected to a reading controller 110. The CPU 101 communicates with the reading unit 111 via the reading controller 110.

A print unit 113 forms an image on a recording sheet by an electrophotographic method. The print unit 113 will be described below. The print unit 113 is connected to a print controller 112. The CPU 101 communicates with the print unit 113 via the print controller 112.

A universal serial bus (USB) host controller 114 takes charge of USB protocol control and mediates access to a USB device such as a USB memory (not illustrated).

A modem 115 modulates or demodulates signals necessary for facsimile communication. The modem 115 is connected to a network control unit (NCU) 116. Signals modulated by the modem 115 are delivered to a public switched telephone network (PSTN) through the NCU 116.

A network interface card (NIC) 117 bidirectionally exchanges data with a mail server, a file server, or the like via a local area network (LAN).

The MFP 10 according to the present exemplary embodiment includes an embedded Multi-Media Card (eMMC) 109 as a storage. The CPU 101 accesses the eMMC 109 via an eMMC host controller 108. The storage is not limited to an eMMC, and a hard disk drive (HDD), a solid state drive (SSD), and the like may be used instead.

Figure 2:
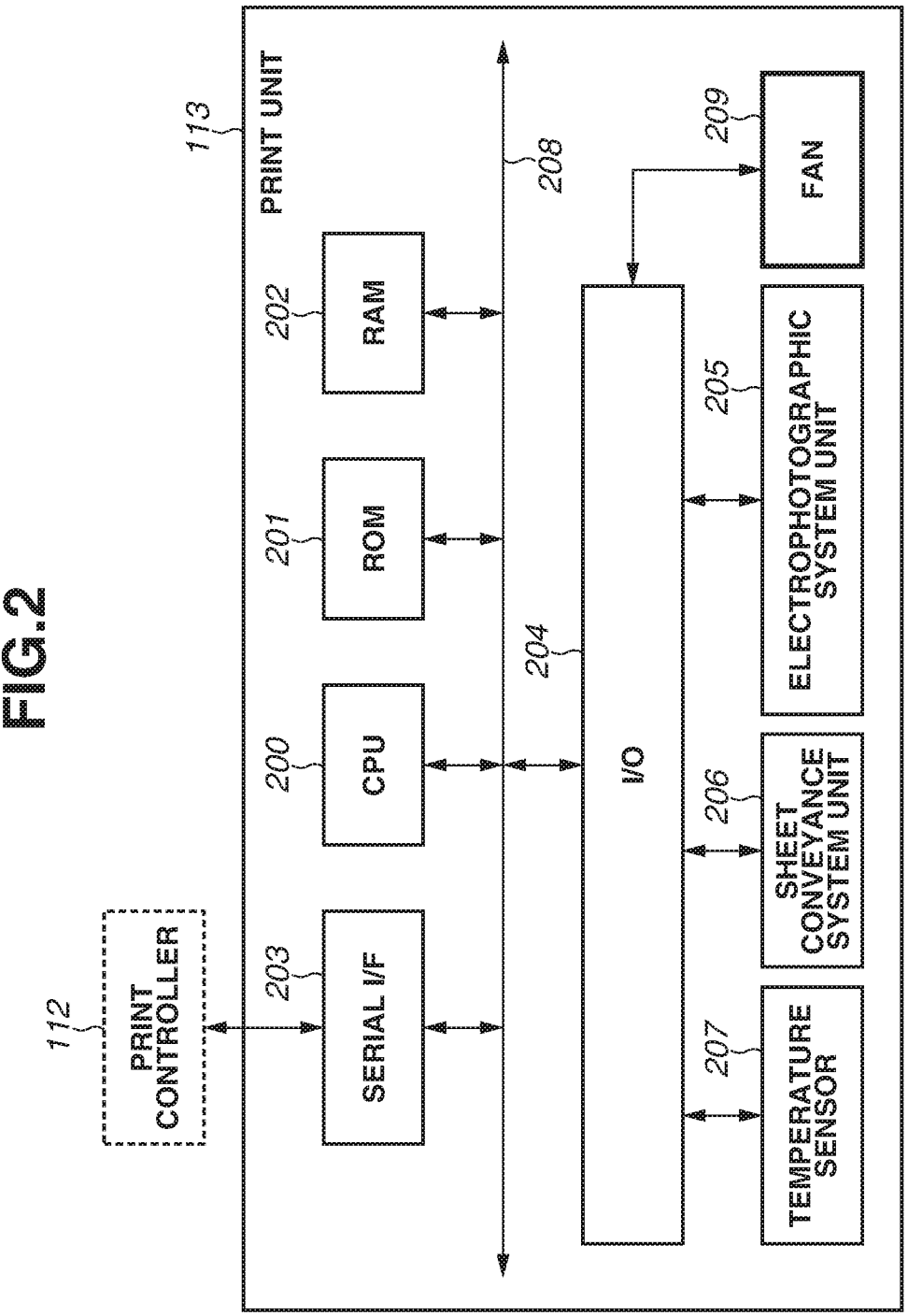
FIG. 2 is a block diagram illustrating a hardware configuration of a print unit according to the first exemplary embodiment.

Next, a hardware configuration of the print unit 113 according to the present exemplary embodiment will be described with reference to a block diagram of FIG. 2.

When power is supplied, a CPU 200 executes a control program stored in a ROM 201. A RAM 202 functions as a work area or the like for the control program. The CPU 200 receives various commands issued by a main program for the MFP 10 via a serial interface (i/f) 203. According to the received various commands, the CPU 200 controls an electrophotographic system unit 205 and a sheet conveyance system unit 206 via an input-output (I/O) 204 which is connected to a system bus 208. Further, the CPU 200 acquires a temperature measurement result obtained by a temperature sensor 207 via the I/O 204. A fan 209 is rotated when execution of dew condensation removal processing is instructed, thereby prompting removal of dew condensation. A heater or the like may be used instead of the fan for dew condensation removal processing.

Figure 3:
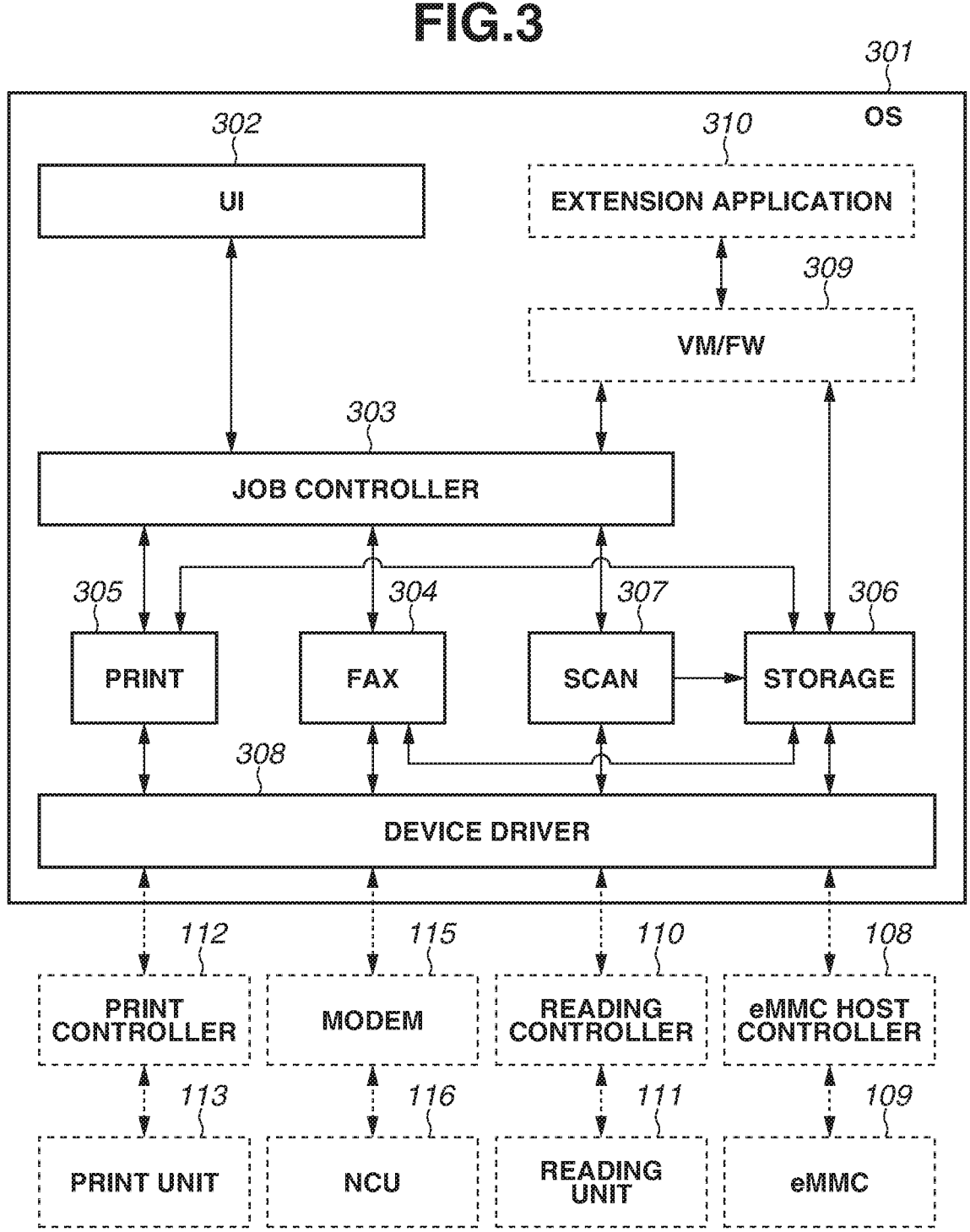
FIG. 3 is block diagram illustrating a software configuration of the MFP according to the first exemplary embodiment.

Next, a software configuration of the MFP 10 according to the present exemplary embodiment will be described with reference to FIG. 3. Each unit indicated by a solid line in FIG. 3 is a software module implemented by the CPU 101 executing the main program loaded into the RAM 103 by the boot program described above.

Each module (described below) implemented by executing the main program is managed and controlled by an operating system (OS) 301. The OS unit 301 is combined with a device driver unit 308. The device driver unit 308 mediates data exchange between hardware devices such as the print controller 112 and the modem 115.

A user interface (UI) unit 302 provides a user with various information via the display unit 105 and the operation unit 107, and receives various instructions from the user. The display unit 105 can be configured to include a touch panel and receive an operation instruction from the user.

A job controller unit 303 receives a job, such as a copy job, a print job, or a fax job, and executes the received job.

A storage unit 306 is a software module that physically stores and manages data, such as images transmitted or received by facsimile and user settings, in the eMMC 109.

For example, in the MFP 10 according to the present exemplary embodiment, when the job controller unit 303 receives a fax job, a scan unit 307 controls the reading unit 111 to scan a document in response to the job request. Scanned facsimile image data is stored in the storage unit 306. The facsimile image data stored in the storage unit 306 is read by a fax unit 304 and is transmitted by facsimile to a partner apparatus via the modem 115 and the NCU 116. Alternatively, the image data received by facsimile from the partner apparatus via the modem 115 and the NCU 116 is acquired by the fax unit 304 and stored in the storage unit 306.

A print unit 305 sends various predetermined commands to the print unit 113 via the print controller 112 and receives the state of the print unit 113, thereby controlling the operation of the print unit 113. For example, in the case of printing an image received by facsimile, the print unit 305 reads an image file stored in the storage unit 306 after sending a print command to the print unit 113, and then transfers image data included in the image file to the print unit 113.

The MFP 10 according to the present exemplary embodiment includes a virtual machine (VM)/framework (FW) unit 309. An extension application unit 310 includes any program described in a script language.

Figure 4:
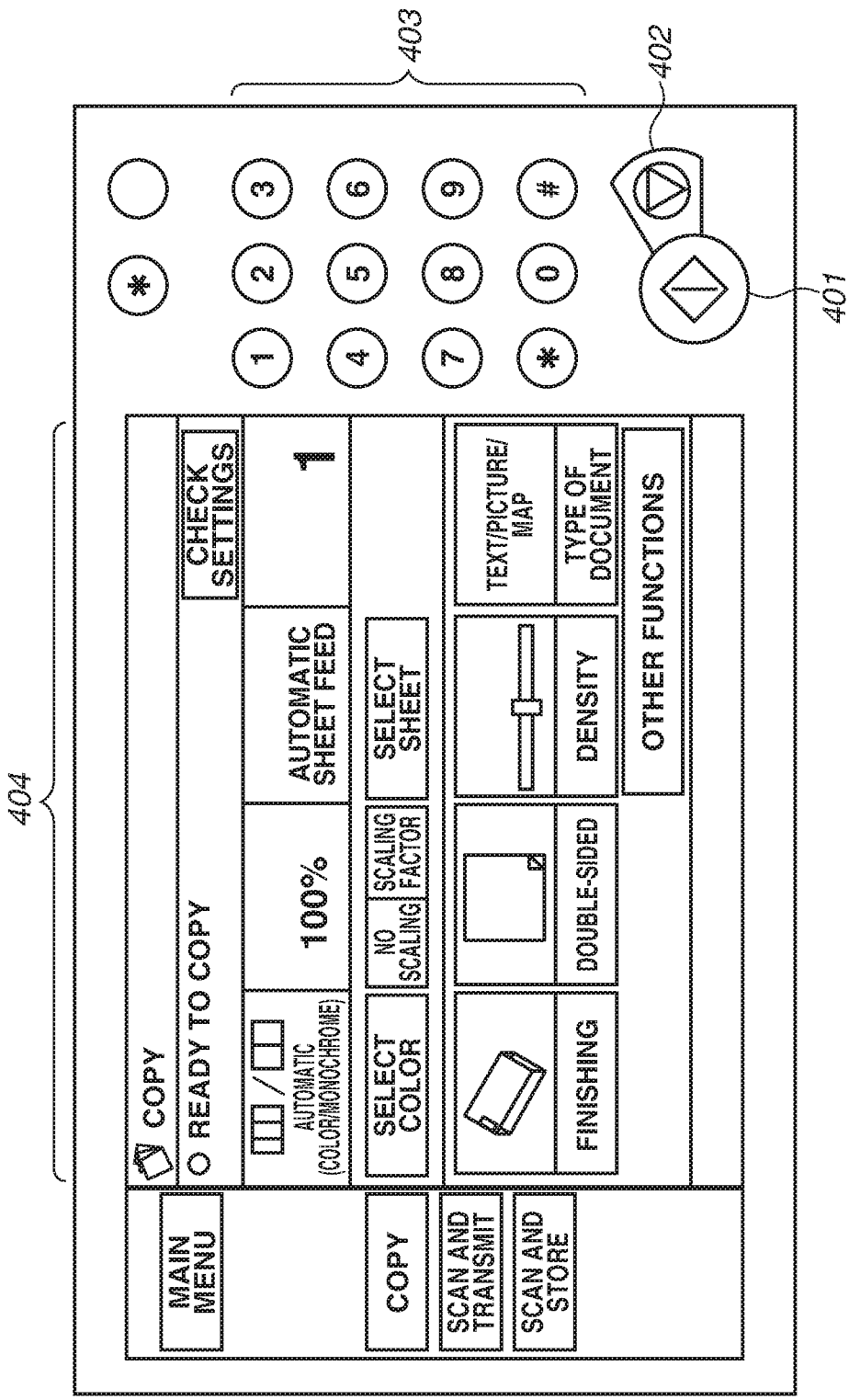
FIG. 4 illustrates a layout configuration example of an operation unit according to the first exemplary embodiment.

Next, a configuration example of the operation unit 107 according to the present exemplary embodiment will be described with reference to FIG. 4.

A start key 401 is a key for receiving a print processing start instruction. A clear/stop key 402 functions as a clear key when the apparatus is in a standby state, and also functions as a stop key when the apparatus is executing a job. A numeric keypad 403 is a key used for the user to input numbers. An area 404 is an area for displaying a screen for the user to make various settings on the MFP 10 so as to execute copying or fax transmission.

Next, processing related to dew condensation countermeasure processing according to the present exemplary embodiment will be described with reference to FIGS. 5 to 12.

Dew Condensation Countermeasure Mode Setting Processing

Figure 5:
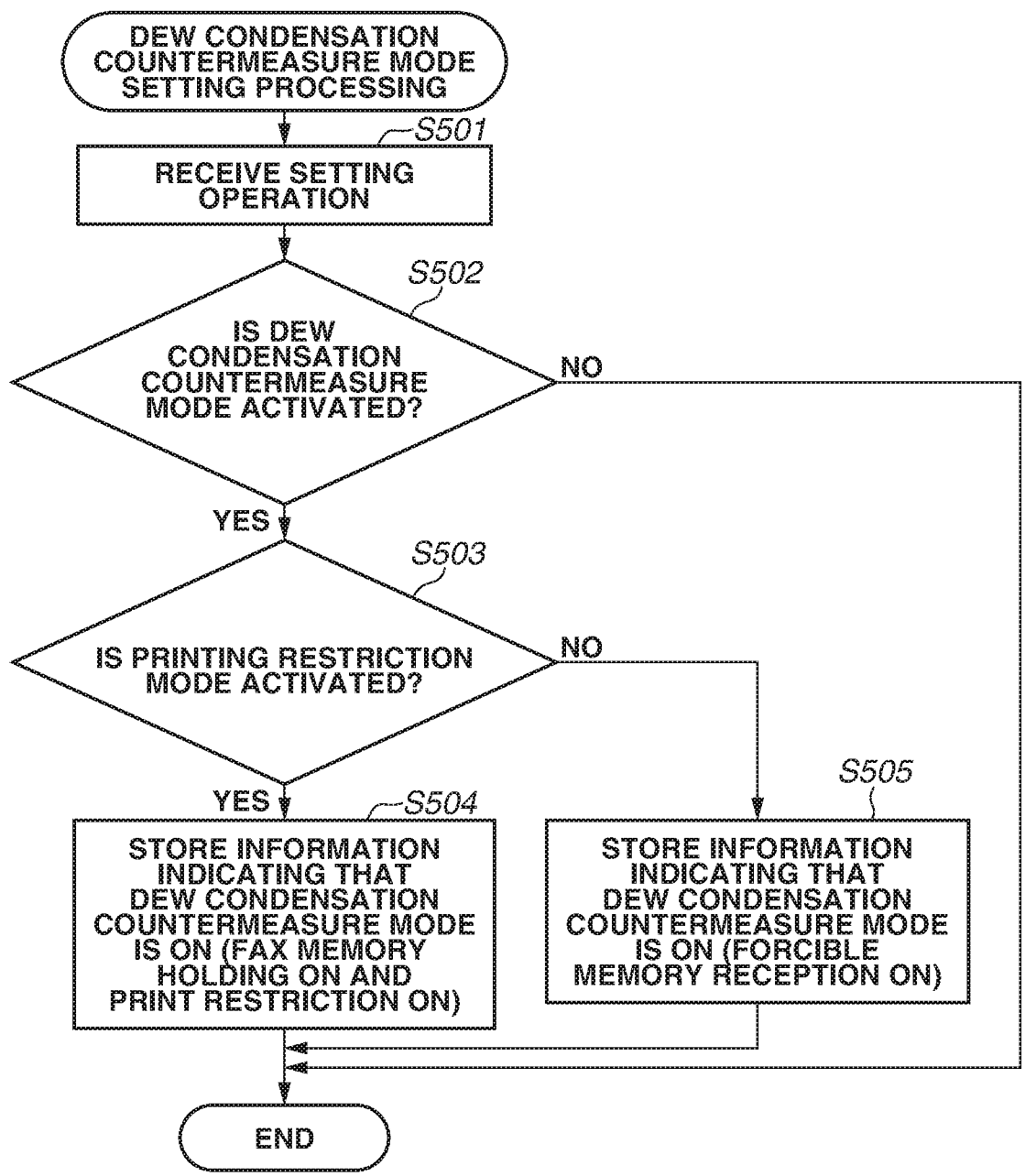
FIG. 5 is a flowchart illustrating dew condensation countermeasure mode setting processing according to the first exemplary embodiment.

First, the dew condensation countermeasure mode setting processing will be described with reference to FIG. 5. The processing illustrated in FIG. 5 is implemented by the CPU 101 reading a program stored in the ROM 102 into the RAM 103 and executing the program. Alternatively, a part of the processing may be implemented by hardware such as a circuit.

The user can activate a dew condensation countermeasure mode by operating the operation unit 107. The dew condensation countermeasure mode described herein refers to a mode for executing environment determination processing for determining whether the MFP 10 is under an environment where dew condensation is more likely to occur, and dew condensation removal processing for removing dew condensation. The dew condensation removal processing is processing for removing dew condensation by, for example, rotating the fan 209 and turning on the heater. Instead of the processing using the fan 209 or the heater, processing of waiting for a predetermined time sufficient for the dew condensation to disappear may be performed.

Figure 8:
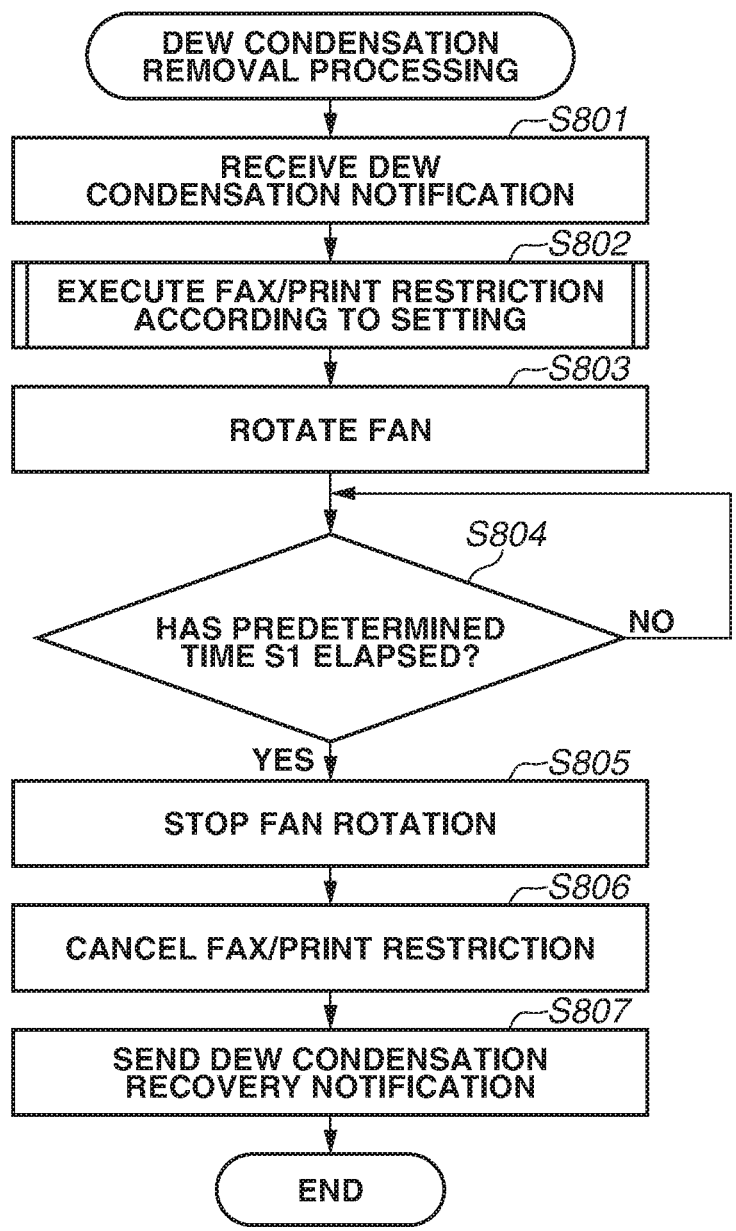
FIG. 8 is a flowchart illustrating dew condensation removal processing according to the first exemplary embodiment.
Figure 9:
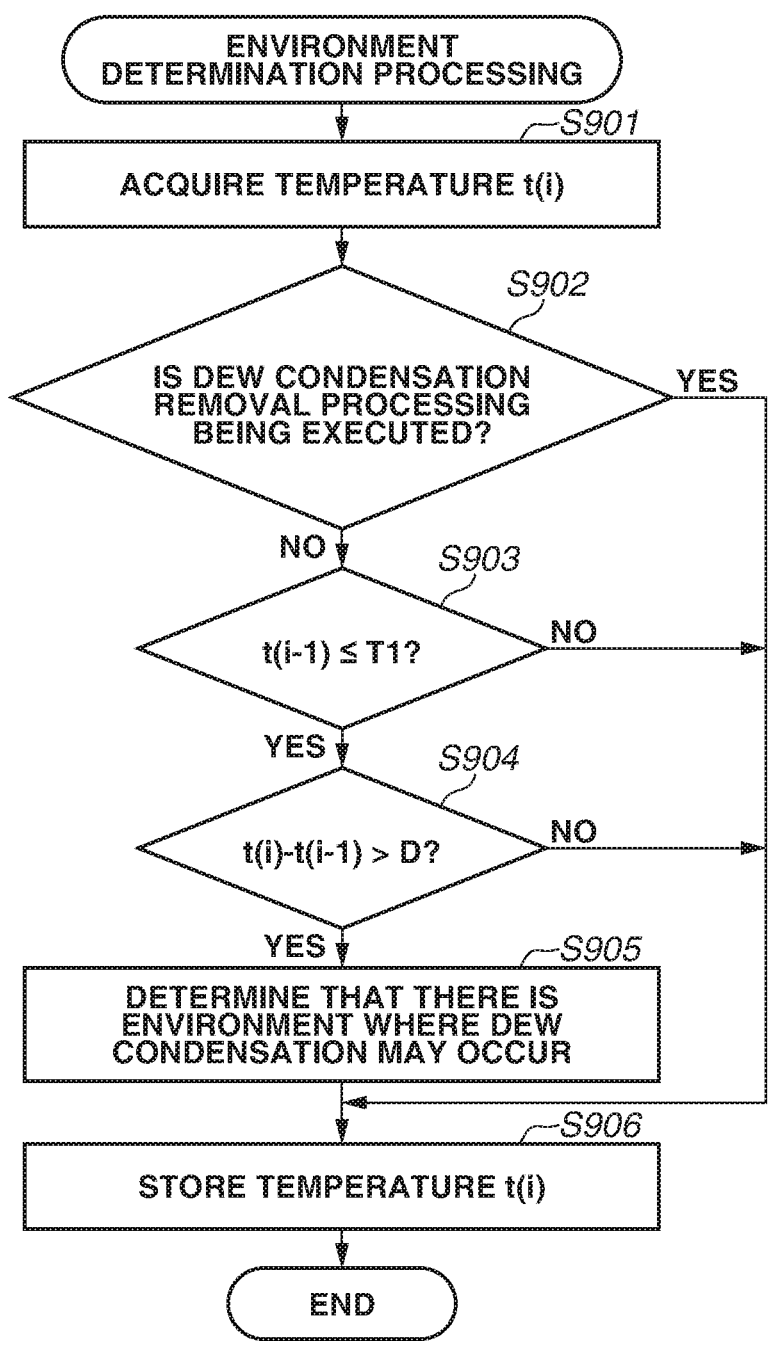
FIG. 9 is a flowchart illustrating environment determination processing according to the first exemplary embodiment.
Figure 10:
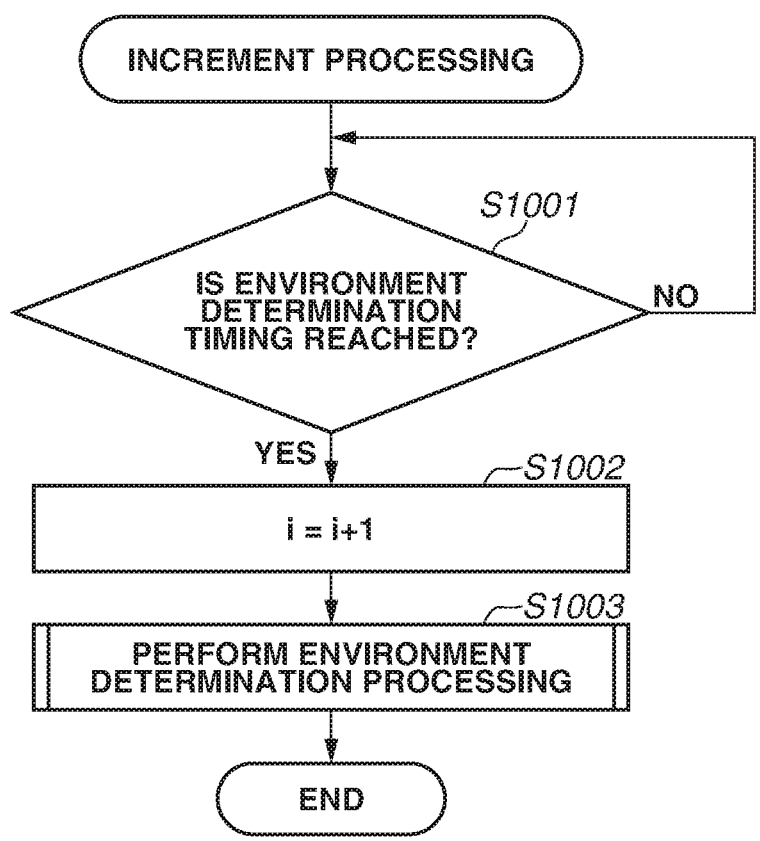
FIG. 10 is a flowchart illustrating increment processing related to environment determination according to the first exemplary embodiment.

The environment determination processing will be described in detail below with reference to FIGS. 9 to 11. Further, the dew condensation removal processing will be described in detail below with reference to FIG. 8.

In the present exemplary embodiment, the user can set whether to activate or deactivate the dew condensation countermeasure mode. Further, when the dew condensation countermeasure mode is activated, the user can set whether to restrict the execution of print processing during execution of the dew condensation removal processing. Only an administrator user who is authenticated based on a user ID and password may be authorized to make these settings.

There is a possibility that dew condensation cannot be completely removed while the dew condensation removal processing is executed, which may lead to deterioration in print quality. The user who wishes to maintain a high print quality can make a setting to activate a print restriction mode (print restriction setting) for restricting the execution of the job until the dew condensation removal processing is completed even in a case where a print job is received during execution of the dew condensation removal processing. In addition, the user who wishes to execute printing during execution of the dew condensation removal processing regardless of possible deterioration of print quality can make a setting to deactivate the print restriction mode during execution of the dew condensation removal processing.

In the present exemplary embodiment, fax data received when the dew condensation countermeasure mode is enabled and the dew condensation removal processing is being executed is held in the memory, such as the RAM 103, and printing is restricted until the dew condensation removal processing is completed. Unlike a print job, fax data cannot be easily input again when printing fails. This is because it is necessary to request a sender who has sent the fax data to retransmit the fax data so as to input the fax data again. Accordingly, during execution of the dew condensation processing in which the print quality may deteriorate, the output of fax data is restricted and the fax data held in the memory is printed after the dew condensation removal processing is completed.

First, the user operates the operation unit 107 to display a dew condensation countermeasure mode setting screen. The user can set whether to activate or deactivate the dew condensation countermeasure mode on the setting screen. Further, when the dew condensation countermeasure mode is activated, the user can further set whether to activate the print restriction mode. For example, when the user presses a setting determination button after selecting activation or deactivation of the dew condensation countermeasure mode and also selecting activation or deactivation of the print restriction mode, the selected content is activated.

Figure 14:
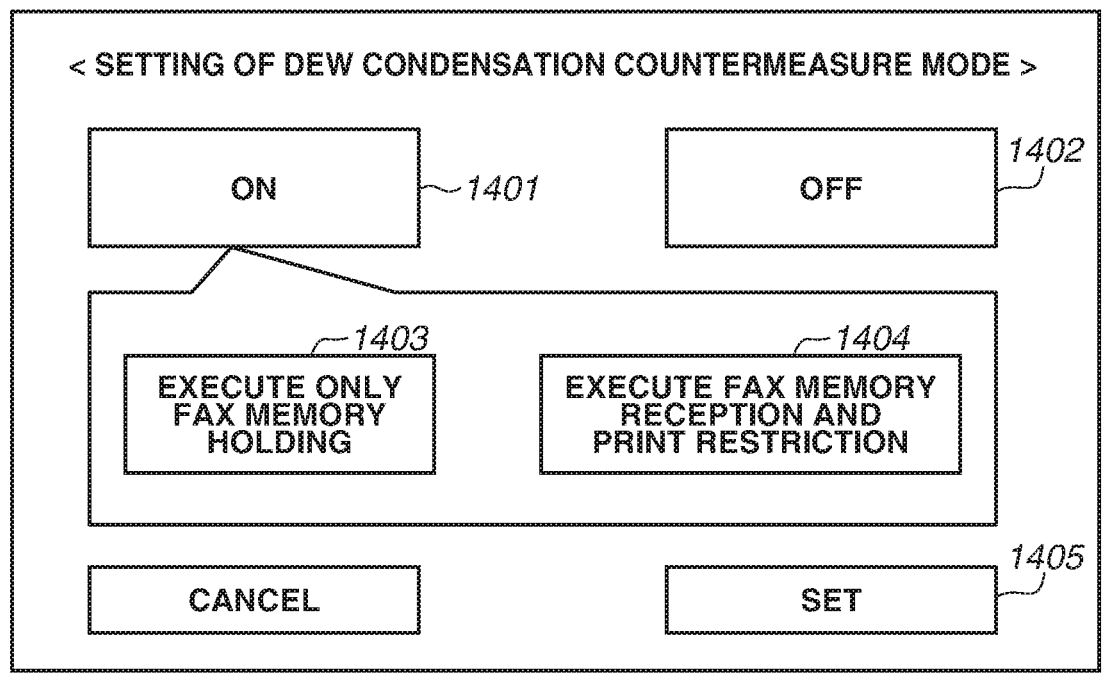
FIG. 14 illustrates an example of a dew condensation countermeasure mode setting screen according to the first exemplary embodiment.

FIG. 14 illustrates an example of the setting screen. A button 1401 is a button for making a setting for activating the dew condensation countermeasure mode. A button 1402 is a button for making a setting for deactivating the dew condensation countermeasure mode. A button 1403 is a button for making a setting such that only holding of fax reception data in the memory is executed and the execution of a print job is not restricted during execution of the dew condensation removal processing. A button 1404 is a button for making a setting such that fax reception data is received in the memory and the execution of a print job is suspended during execution of the dew condensation removal processing. A button 1405 is a button for determining a content set on the setting screen.

The setting processing will be described in detail with reference to FIG. 5. In step S501, the CPU 101 receives a setting content via the operation controller 106. The setting content is received at, for example, a timing when the setting determination button described above is pressed.

In step S502, the CPU 101 determines whether the dew condensation countermeasure mode is activated by the setting. If the dew condensation countermeasure mode is not activated (NO in step S502), the setting is made according to the operation content and then the processing is terminated.

On the other hand, if the dew condensation countermeasure mode is activated (YES in step S502), the processing proceeds to step S503, and in step S503, the CPU 101 determines whether the print restriction mode is activated. As described above, the print restriction mode is a mode for restricting the execution of printing during execution of the dew condensation removal processing.

If the print restriction mode is activated (YES in step S503), the processing proceeds to step S504. In step S504, information indicating that the dew condensation countermeasure mode is activated and the print restriction mode is also activated is stored in the eMMC 109. In the present exemplary embodiment, when the dew condensation countermeasure mode is activated, a fax data memory holding function is automatically activated. Accordingly, in step S504, information indicating that the dew condensation countermeasure mode is activated, the fax data memory holding function is activated, and the print restriction function is activated is stored in the eMMC 109.

On the other hand, if the print restriction mode is not activated (NO in step S503), the processing proceeds to step S505. In step S505, information indicating that the dew condensation countermeasure mode is activated but the print restriction mode is not activated is stored in the eMMC 109. Like in step S504, when the dew condensation countermeasure mode is activated, the fax data memory holding function is automatically activated. Accordingly, in step S505, information indicating that the dew condensation countermeasure mode is activated and the fax data memory holding function is also activated is stored in the eMMC 109.

After completion of the processing of step S504 or step S505, the dew condensation countermeasure mode setting processing is terminated.

Dew Condensation Countermeasure Execution Processing

Figure 6:
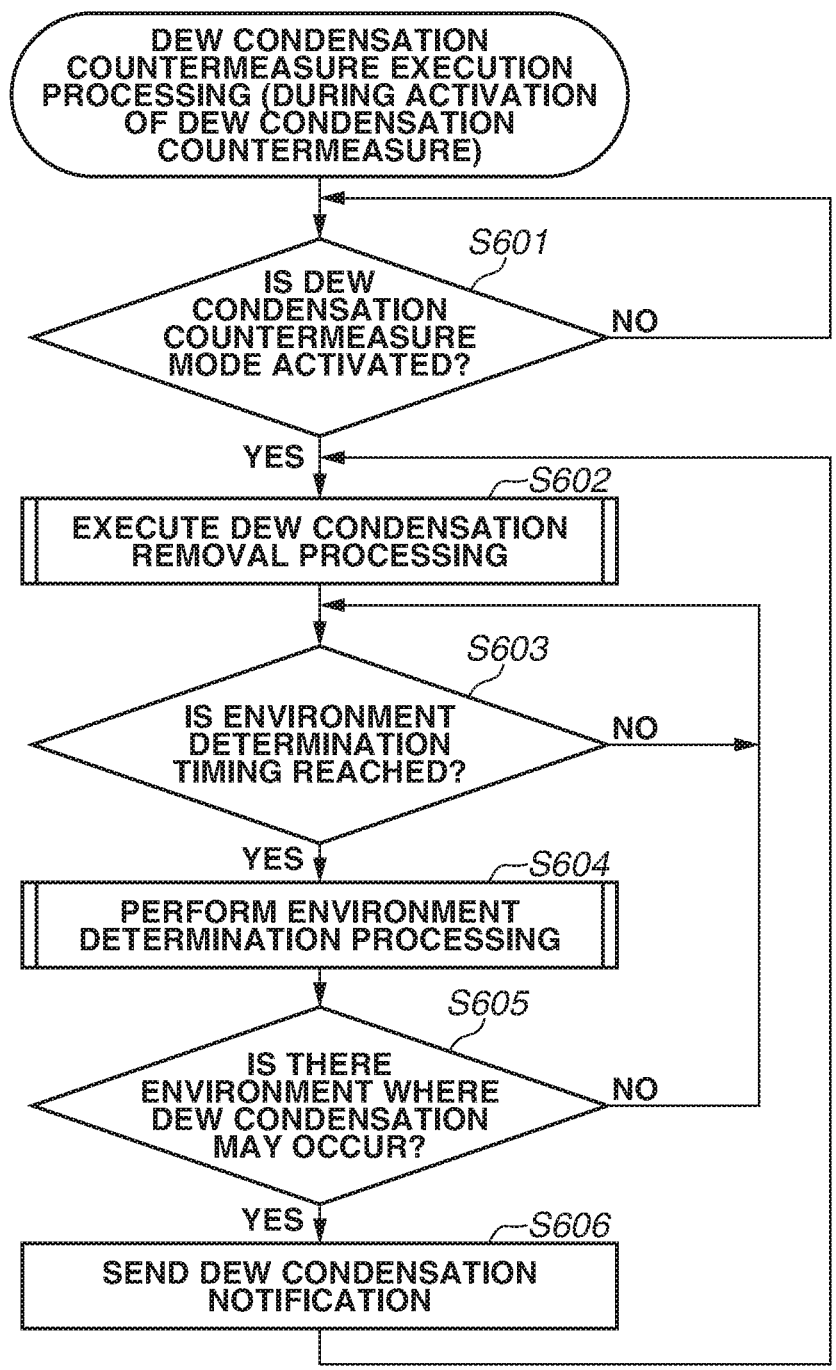
FIG. 6 is a flowchart illustrating dew condensation countermeasure execution processing (during activation of a dew condensation countermeasure mode) according to the first exemplary embodiment.
Figure 7:
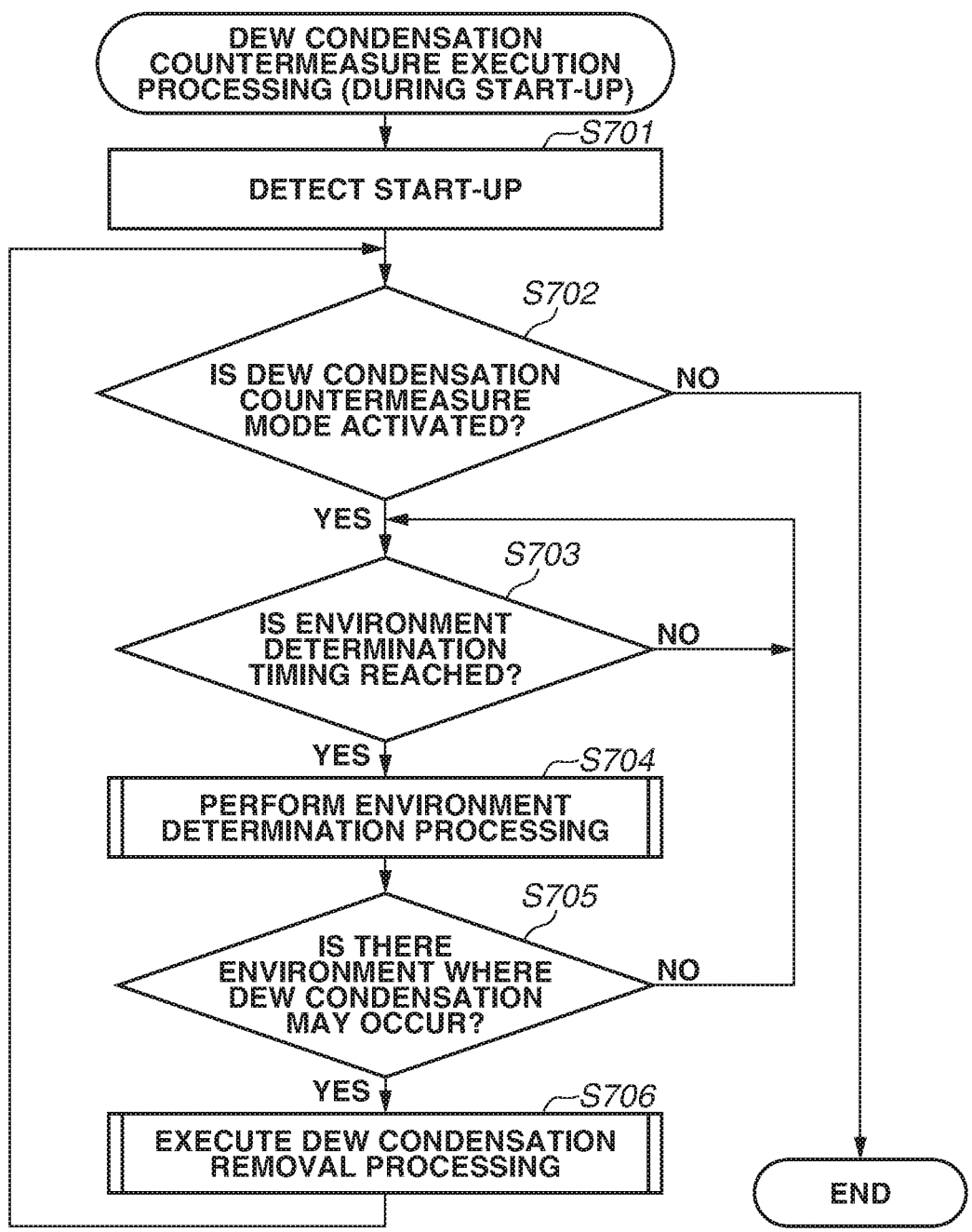
FIG. 7 is a flowchart illustrating the dew condensation countermeasure execution processing (during start-up) according to the first exemplary embodiment.

Next, dew condensation countermeasure execution processing will be described with reference to FIGS. 6 and 7. FIG. 6 is a flowchart illustrating the dew condensation countermeasure processing performed at a timing when a setting for activating the dew condensation countermeasure mode is determined. FIG. 7 is a flowchart illustrating the dew condensation countermeasure processing performed when the power of the MFP 10 is turned off after the activation of the dew condensation countermeasure mode is determined, and the power of the MFP 10 is also turned on thereafter.

The CPU 200 loads a program read from the ROM 201 into the RAM 202 and executes the program, thereby executing the processing illustrated in FIGS. 6 and 7.

The processing illustrated in FIG. 6 will now be described. In step S601, the CPU 200 determines whether the setting for activating the dew condensation countermeasure mode has been determined. The CPU 200 repeats the processing of step S601 until the activation of the dew condensation countermeasure mode is determined.

If the setting for activating the dew condensation countermeasure mode is made (YES in step S601), the processing proceeds to step S602, in step S602, the CPU 200 controls the dew condensation removal processing to be started. The CPU 200 outputs a dew condensation notification to the program for performing the dew condensation removal processing. The dew condensation removal processing will be described in detail below with reference to FIG. 8.

After completion of the dew condensation removal processing, in step S603, the CPU 200 determines whether an environment determination timing is reached. The environment determination timing is a timing for performing determination processing for determining whether a temperature environment inside or outside of the apparatus of the MFP 10 is in a state where dew condensation may occur. For example, the MFP 10 performs environment determination processing at predetermined time intervals. For example, the temperature is measured every 10 minutes to thereby determine whether the temperature environment is in the state where dew condensation may occur.

If the environment determination timing is not reached (NO in step S603), the CPU 200 repeats the processing of step S603 until the environment determination timing is reached. On the other hand, if it is determined that the environment determination timing is reached (YES in step S603), the processing proceeds to step S604. In step S604, the CPU 200 performs the environment determination processing. The environment determination processing will be described below with reference to FIG. 9.

Next, in step S605, the CPU 200 determines whether there is an environment in which dew condensation may occur as a result of the environment determination processing. If it is determined that there is no environment where dew condensation may occur (NO in step S605), the processing returns to step S603. On the other hand, if it is determined that there is an environment where dew condensation may occur (YES in step S605), the processing proceeds to step S606. In step S606, the CPU 200 sends the dew condensation notification to the program for performing the dew condensation removal processing. After that, the processing returns to step S601.

Next, processing performed when the MFP 10 is started in a state where the dew condensation countermeasure mode is activated. In the example illustrated in FIG. 6, the dew condensation removal processing is started immediately after the dew condensation countermeasure mode is activated, while in the example illustrated in FIG. 7, when the MFP 10 is started, the CPU 101 first performs the environment determination processing and starts the dew condensation removal processing after determining that the timing when dew condensation can occur is reached.

The CPU 200 loads a program read from the ROM 201 into the RAM 202 and executes the program, thereby executing the processing illustrated in FIG. 7.

When a power switch is operated in a state where the power of the MFP 10 is turned off and power-on is instructed, the CPU 101 starts start-up processing for the MFP 10. When the CPU 200 detects that the start-up processing is performed in step S701, the processing proceeds to step S702.

Next, in step S702, the CPU 200 determines whether the dew condensation countermeasure mode is activated. For example, the CPU 200 can determine whether the dew condensation countermeasure mode is activated by checking the dew condensation countermeasure mode setting content set in the eMMC 109. If the dew condensation countermeasure mode is not activated (NO in step S702), the dew condensation countermeasure execution processing is terminated.

On the other hand, if the dew condensation countermeasure mode is activated (YES in step S702), the processing proceeds to step S703. In step S703, the CPU 200 determines whether the environment determination timing is reached. If the environment determination timing is not reached (NO in step S703), the CPU 200 repeats the processing of step S703. On the other hand, if the environment determination timing is reached (YES in step S703), the processing proceeds to step S704. In step S701, the environment determination processing is executed. The environment determination processing will be described in detail with reference to FIG. 9.

Next, in step S705, the CPU 200 determines whether it is determined that there is an environment where dew condensation may occur as a result of the environment determination processing. If it is determined that there is no environment where dew condensation may occur (NO in step S705), the processing returns to step S703. On the other hand, if it is determined that there is an environment where dew condensation may occur (YES in step S705), the processing proceeds to step S706, and then in step S706, the dew condensation removal processing is executed. After completion of the dew condensation removal processing, the processing returns to step S702.

Dew Condensation Removal Processing

Next, the dew condensation removal processing will be described with reference to FIG. 8. The CPU 200 loads a program read from the ROM 201 into the RAM 202 and executes the program, thereby executing the processing illustrated in FIG. 8.

When the dew condensation notification is received from the CPU 101 in step S801, the dew condensation removal processing program executed by the CPU 200 performs fax memory reception control according to the setting stored in step S504 or S505 illustrated in FIG. 5. If the print restriction mode is activated, print restriction processing is executed in step S802.

Next, in step S803, the CPU 200 causes the fan 209 to rotate. Instead of rotating the fan the heater (not illustrated) may be powered on. Alternatively, both the fan 209 and the heater may be operated.

Next, in step S804, the CPU 200 determines whether a predetermined time S1 has elapsed from the time when the fan 209 is rotated. If the predetermined time S1 has not elapsed (NO in step S804), the CPU 200 repeats the processing of step S804 until the lapse of the predetermined time S1. If the predetermined time S1 has elapsed (YES in step S804), the processing proceeds to step S805. In step S805, the CPU 200 stops the rotation of the fan 209. In step S806, the CPU 200 cancels the fax restriction and print restriction executed in step S802. After the restriction is cancelled, the suspended print processing or fax data print processing is executed. Specifically, such print processing is executed after completion of the dew condensation removal processing. In step S807, the CPU 200 outputs a dew condensation recovery notification to the program for performing the environment determination processing, and then the processing is terminated.

Environment Determination Processing

Next, the environment determination processing will be described with reference to FIGS. 9 and 10. The CPU 200 loads a program read from the ROM 201 into the RAM 202 and executes the program, thereby executing the processing illustrated in FIGS. 9 and 10. The environment determination processing is started when the CPU 101 determines that the timing for performing the environment determination processing is reached. The timing determination processing will be described below with reference to FIG. 11.

First, in step S901, the CPU 200 acquires a measurement result of an environmental temperature t(i) from the temperature sensor 207. In the present exemplary embodiment, the environmental temperature is a temperature within the housing of the MFP 10. The CPU 200 acquires the temperature measured by the temperature sensor 207 as the environmental temperature t(i).

Next, in step S902, the CPU 200 determines whether the dew condensation removal processing as described above with reference to FIG. 8 is being executed. If it is determined that the dew condensation removal processing is being executed (YES in step S902), the processing proceeds to step S906. On the other hand, if it is determined that the dew condensation removal processing is not being executed (NO in step S902), the processing proceeds to step S903.

In step S903, the CPU 200 determines whether a previously measured environmental temperature t(i−1) is equal to or lower than a predetermined temperature T1. If the environmental temperature t(i−1) is equal to or lower than the predetermined temperature T1 (YES in step S903), the processing proceeds to step S904. On the other hand, if the environmental temperature t(i−1) is higher than the predetermined temperature T1 (NO in step S903), the processing proceeds to step S906.

In step S904, the CPU 200 determines whether a difference between the environmental temperature t(i) and the environmental temperature t(i−1) measured prior to the predetermined time S1 is greater than a predetermined reference value D. If the difference is greater than the reference value D (YES in step S904), the processing proceeds to step S905, and then in step S905, it is determined that there is an environment where dew condensation may occur. On the other hand, if the difference is equal to or smaller than the reference value D, the processing proceeds to step S906 and the CPU 200 executes the processing of step S906.

A case where the environmental temperature t(i−1) is equal to or lower than the predetermined temperature T1 (YES in step S903) and the difference (t(i)−t(i−1)) is greater than the reference value D (YES in step S904) indicates that the ambient temperature has increased at a relatively low temperature. It is estimated that the humidity also increases in accordance with the temperature, and thus it can be determined that dew condensation may occur. If it is determined that there is an environment where dew condensation may occur, the dew condensation removal processing is started as described above with reference to FIGS. 6 and 7.

In step S906, the CPU 200 stores the environmental temperature t(i), which is acquired in step S901, in the RAM 202.

Next, processing for incrementing the environmental temperature t(i) will be described with reference to FIG. 10. In step S1001, the CPU 200 performs the timing determination processing which will be described below with reference to FIG. 11, i.e. determines whether the environment determination timing is reached. If it is determined that the environment determination timing is not reached (NO in step S1001), the CPU 200 repeats the processing of step S1001.

On the other hand, if it is determined that the environment determination timing is reached (YES in step S1001), the processing proceeds to step S1002. In step S1002, "i" of the environmental temperature t(i) is incremented.

After completion of the processing of step S1002, the processing proceeds step S1003, and then in step S1003, the CPU 200 executes the environment determination processing as described above with reference to FIG. 9.

The above-described processing is merely an example of the method for detecting whether dew condensation may occur. Methods other than the above-described method may also be used. For example, the humidity within the apparatus of the MFP 10 may be measured, and the occurrence of dew condensation may be determined based on the detected humidity. Not only the temperature and humidity within the apparatus but also the temperature and humidity outside the apparatus may be used.

Timing Determination Processing

Next, the timing determination processing for determining whether an environment determination processing execution timing is reached will be described with reference to FIG. 11. The CPU 200 loads a program read from the ROM 201 into the RAM 202 and executes the program, thereby executing the processing illustrated in FIG. 11.

In step S1101, the CPU 200 determines whether a predetermined time S2 has elapsed from the time when the previous environment determination processing is executed. If the processing of step S1101 is performed for the first time after the MFP 10 is started, the CPU 200 determines whether the predetermined time S2 has elapsed from the time when the MFP 10 is started.

If it is determined that the predetermined time S2 has elapsed (YES in step S1101), the processing proceeds to step S1104, and then in step S1104, the CPU 200 determines that the environment determination timing is reached.

On the other hand, if it is determined that the predetermined time S2 has not elapsed (NO in step S1101), the processing proceeds to step S1102. In step S1102, the CPU 200 determines whether the MFP 10 has recovered from a power-saving state. If the MFP 10 has recovered from the power-saving state (YES in step S1102), the processing proceeds to step S1104, and then in step S1104, the CPU 200 determines that the environment determination timing is reached. If a recovery event from the power-saving state has not occurred (NO in step S1102), the processing proceeds to step S1103, and then in step S1103, the CPU 200 determines whether a print job is input. If there is no input event of a print job, the processing returns to step S1101. On the other hand, if a print job is input, the CPU 200 determines that the environment determination timing is reached.

According to the processing described above, the CPU 200 determines that the environment determination timing is reached when the predetermined time S2 has elapsed from start-up or previous environment determination processing, when the MET 10 has recovered from the power-saving state, and when a print job is received.

Figure 11:
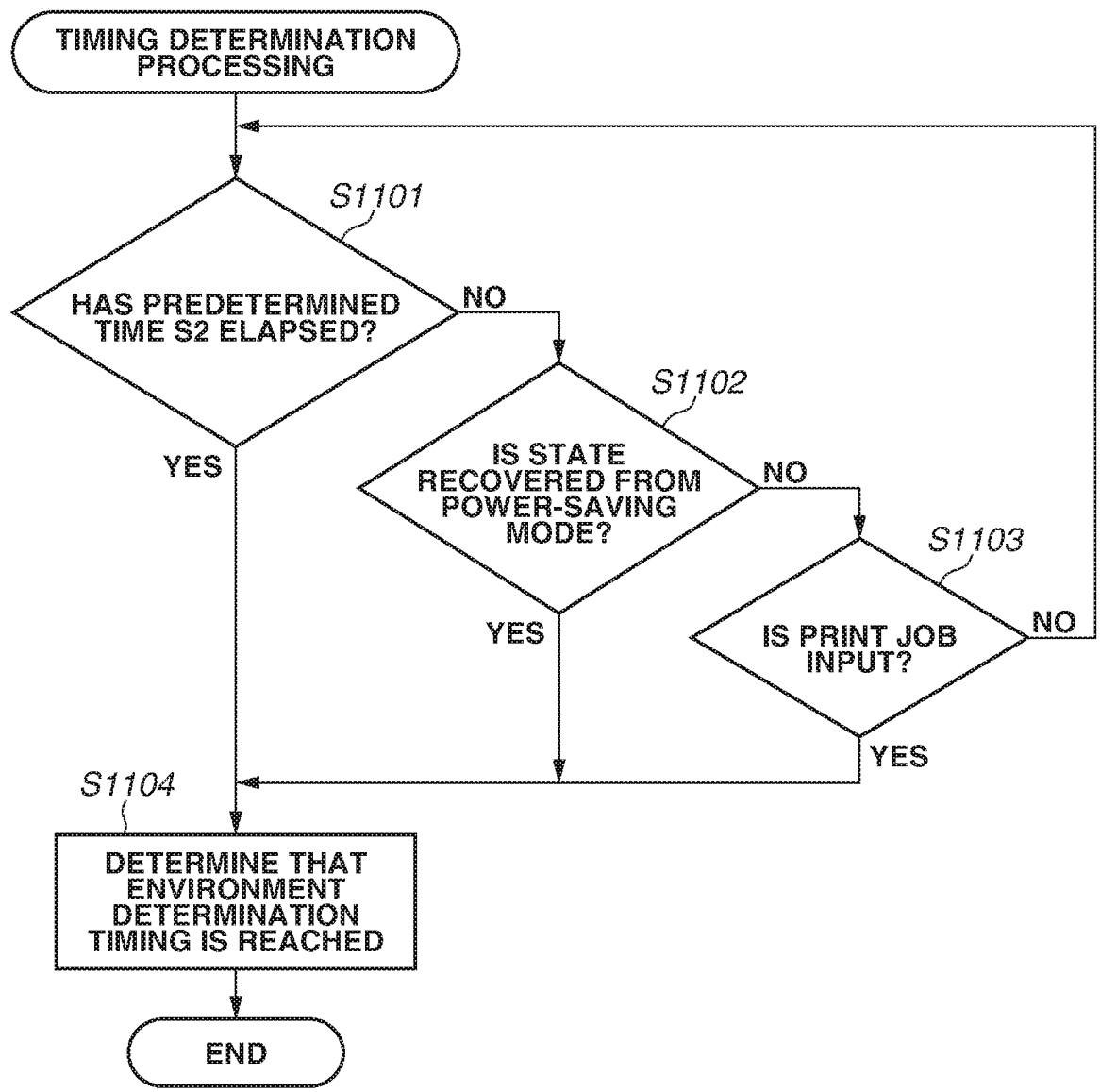
FIG. 11 is a flowchart illustrating determination processing for determining an environment determination timing according to the first exemplary embodiment.

The determination method illustrated in FIG. 11 is merely an example, and it may be determined that the environment determination timing is reached when a factor other than the factors described above occurs.

The dew condensation countermeasure processing can be implemented by the processing described above with reference to FIGS. 5 to 11. The exemplary embodiment described above illustrates an example where each processing illustrated in FIGS. 5 to 11 is executed by the CPU 101 or the CPU 200. However, the main unit that executes the processing is not limited to the CPU 101 or the CPU 200 described above as examples. The processing described above as processing to be executed by the CPU 200 may be executed by the CPU 101. Alternatively, the processing described above as processing to be executed by the CPU 101 may be executed by the CPU 200. A part of the processing in one flowchart may be executed by the CPU 101, and the other part of the processing may be executed by the CPU 200.

Job Execution Checking Processing

Figure 12:
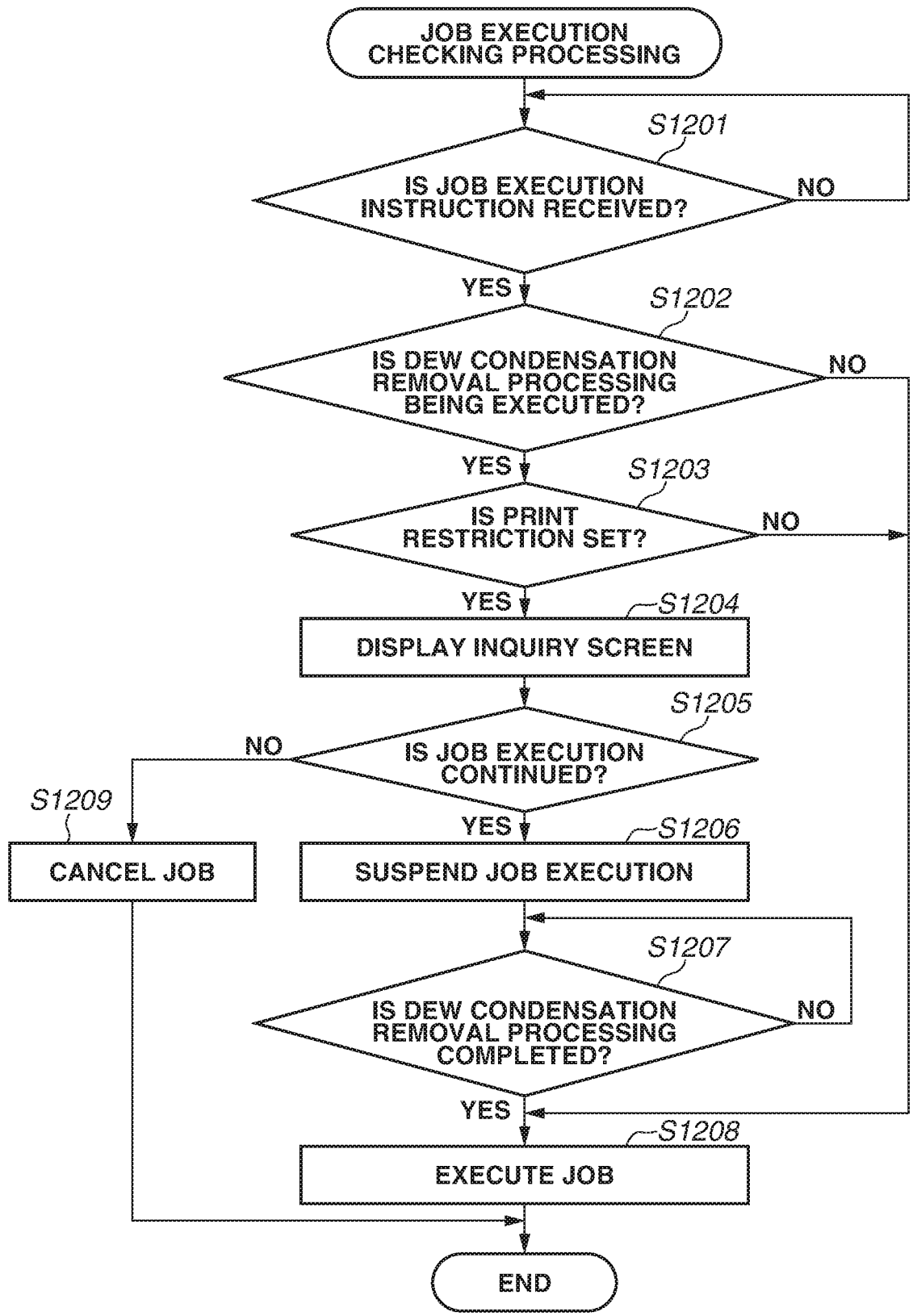
FIG. 12 is a flowchart illustrating job execution checking processing according to the first exemplary embodiment.

Next, job execution checking processing will be described with reference to FIG. 12. The processing illustrated in FIG. 12 is implemented by the CPU 101 reading a program stored in the ROM 102 into the RAM 103 and executing the read program. Alternatively, a part of the processing may be implemented by hardware such as a circuit.

The job checking processing is processing for confirming with the user whether to execute a print job in a case where the print job is input during execution of the dew condensation removal processing in a state where the print restriction mode is valid. In a case where the print job is input when the print restriction mode is activated and the dew condensation removal processing is being executed, printing is executed after completion of the dew condensation removal processing. Accordingly, there is a possibility that the user cannot obtain a printed material quickly. In such case, the user can obtain a printed material quickly by inputting the print job to another printing apparatus that is not carrying out the dew condensation removal processing to make the printing apparatus execute the dew condensation removal processing.

In the checking processing illustrated in FIG. 12, when the print job is input during execution of the dew condensation removal processing in a state where the print restriction mode is activated, a user inquiry screen is displayed on the display unit 105 to inquire of the user whether to cause the MFP 10 to execute the job. When cancellation of the job is instructed from the user, the received job is cancelled. Details of the processing will be described below with reference to FIG. 12.

First, in step S1201, the CPU 101 determines whether a print job execution instruction is received. If the print job execution instruction is not received (NO in step S1201), the CPU 101 repeats the processing of step S1201.

If it is determined that the print job execution instruction is received (YES in step S1201), the processing proceeds to step 1202. In step S1202, the CPU 101 determines whether the dew condensation removal processing is being executed. If the dew condensation removal processing is not being executed (NO in step S1202), the processing proceeds to step S1208 to execute the job.

If it is determined that the dew condensation removal processing is being executed in step S1202 (YES in step S1202), the processing proceeds to step S1203. In step S1203, the CPU 101 determines whether the setting for activating the print restriction mode has been made.

If the print restriction mode is not activated (NO in step S1203), the processing proceeds to step S1208. In step S1208, the CPU 101 causes the print unit 113 to execute the print job. In this case, the inquiry screen to be described below is not displayed. On the other hand, if it is determined that the print restriction mode is activated (YES in step S1203), the processing proceeds to step S1204. In step S1204, the CPU 101 causes the display unit 105 to display the inquiry screen illustrated in FIG. 13.

The inquiry screen functions as a notification screen for notifying the user that it may take a while to execute the input job because the dew condensation removal processing is being executed. The inquiry screen also functions as a selection screen for allowing the user to select whether to execute or cancel the input job. If the user presses a NO button 1302, the execution of the job can be cancelled. That is, the input job is cancelled. On the other hand, if the user presses a YES button 1301, the execution of the job is continued. In this case, the job is executed after completion of the dew condensation removal processing. For example, after completion of the rotation of the fan 209 for the predetermined time S1, the printed material corresponding to the print job is output by the print unit 113.

Figure 13:
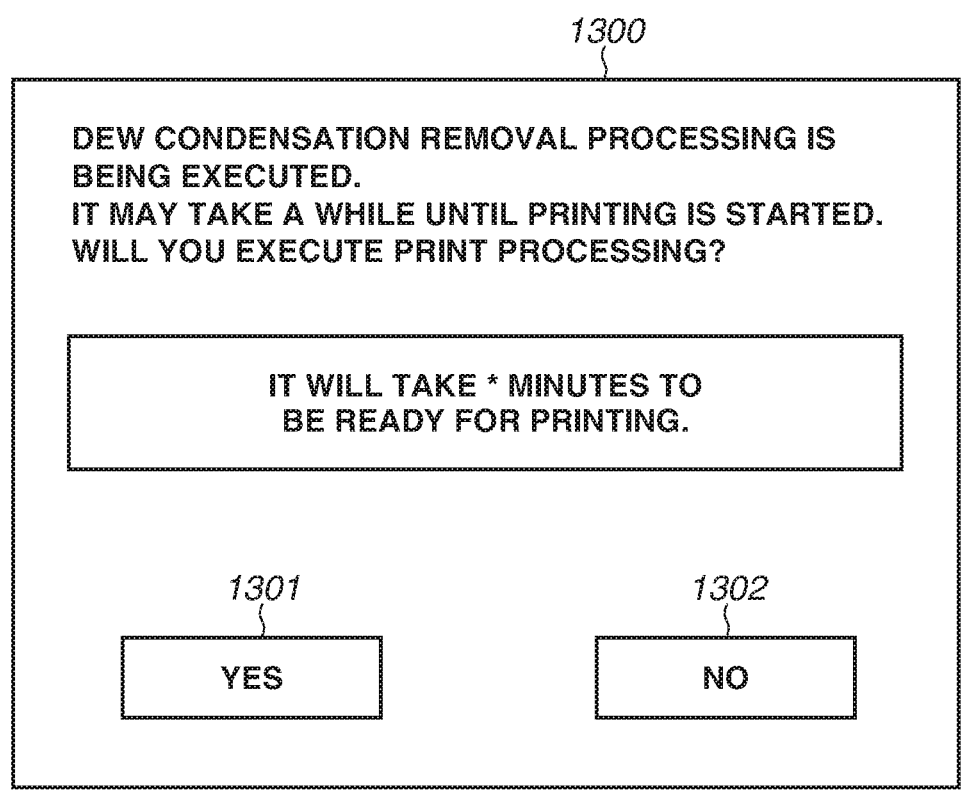
FIG. 13 illustrates an example of a user inquiry screen according to the first exemplary embodiment.

The content of the inquiry screen is not limited to the example illustrated in FIG. 13. Instead of displaying the YES and NO buttons, CANCEL JOB and EXECUTE JOB buttons may be displayed. A remaining time until the dew condensation removal processing is completed may be displayed on an inquiry screen 1300. A time required for completion of the printing removal processing can be calculated by subtracting the elapsed time from the start of the rotation of the fan 209 from the predetermined time S1. The calculated time is displayed on the inquiry screen. The calculated time may be displayed not as the time required for completion of the dew condensation removal processing but as a time required to be ready for printing.

Thus, upon reception of a print job during execution of the dew condensation removal processing, the CPU 101 performs display control for causing the display unit 105 to display the selection screen for selecting whether to execute or cancel the print processing based on the print job.

In step S1205, the CPU 101 determines whether to continue the execution of the input job. This determination processing is executed based on the input result of the inquiry screen. For example, if the user inputs an instruction to continue the execution of the job on the inquiry screen, the CPU 101 determines that the job execute is continued (YES in step S1205) and the processing proceeds to step S1206. On the other hand, if the user inputs an instruction to cancel the execution of the job on the inquiry screen, the CPU 101 determines that the execution of the job is cancelled (NO in step S1205), and the processing proceeds to step S1209.

In step S1209, the CPU 101 cancels the job and then terminates the processing.

In step S1206, the CPU 101 holds the input job in the RAM 103, and the processing proceeds to step S1207. In step S1207, the CPU 101 determines whether the dew condensation removal processing is completed. For example, in a case where the dew condensation recovery notification is output in step S807 illustrated in FIG. 8, the CPU 101 can determine whether the dew condensation removal processing is completed. If the dew condensation removal processing is completed (YES in step S1207), the processing proceeds to step S1208 and the CPU 101 controls the print unit 113 to execute the suspended job.

According to the processing described above, it is possible to notify the user that it may take a while to execute the input job because the dew condensation removal processing is being executed. If it may take a while to execute the job, it is possible to make the user select whether to execute or cancel the job once input.

In a case where the execution of print processing is selected, the MFP 10 performs print control for executing print processing after completion of the dew condensation removal processing. Further, in a case where cancellation of the execution of print processing is selected, the MFP 10 performs print control for cancelling the print job.

Thus, in a case where it takes a while to execute a job once input, the user can cancel the job. In other words, it is possible to prevent the user from waiting for a long time until the job is executed. Specifically, the occurrence of a downtime unintended by the user can be suppressed even in a case where a job is input in a state where dew condensation may occur.

Other Exemplary Embodiments

Various embodiments of the present disclosure can also be implemented by processing in which a program for implementing one or more functions according to the exemplary embodiments described above is supplied to a system or apparatus via a network or storage medium, and one or more processors in a computer of the system or apparatus read and execute the program. Various embodiments of the present disclosure can also be implemented by a circuit (e.g., an application specific integrated circuit (ASIC)) for implementing the one or more of functions.

According to the configuration described above, it is possible to suppress the occurrence of a downtime unintended by the user even in a case where a job is input in a state where dew condensation may occur.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-207441, filed Oct. 26, 2017, which is hereby incorporated by reference herein in its entirety.

What is claimed is:

1. An image forming apparatus comprising:
an image forming device configured to form an image on a sheet, wherein the image forming device is capable of executing image forming processing;
a display device configured to display information; and
at least one controller configured to function as:
a unit configured to perform dew condensation removal processing; and
a unit configured to cause the display device to display a notification screen, in response to input of an instruction for executing image forming processing while the dew condensation removal processing is in progress,
wherein information about dew condensation, information about timing to start the image forming processing and at least one button are arranged on the notification screen, and the instruction for executing the image forming processing is canceled in a case where the at least one button is selected.

2. The image forming apparatus according to claim 1, wherein the controller is configured to further function as a unit configured to prohibit execution of fax image forming processing in which image forming based on fax data is started in response to receipt of the fax data and stores the received fax data in a storage while the dew condensation removal processing is in progress.

3. The image forming apparatus according to claim 2, wherein, in response to end of the dew condensation removal processing, the controller is configured to cause the image forming device to execute image forming based on the fax data stored in the storage.

4. The image forming apparatus according to claim 2, wherein the controller is configured to delete fax data in response to completion of image forming based on the fax data.

5. The image forming apparatus according to claim 1, further comprising a fan configured to be driven for air ventilation,
wherein the fan is driven while the dew condensation removal processing is in progress.

6. The image forming apparatus according to claim 1, further comprising a sensor configured to acquire temperature information,
wherein the dew condensation removal processing is activated based on the temperature information.

7. The image forming apparatus according to claim 6, wherein the controller is configured to cause the display device to display a screen for specifying whether to enable a setting for monitoring the temperature information.

8. The image forming apparatus according to claim 6, wherein the controller is configured to determine whether to execute the dew condensation removal processing when a predetermined time has passed in a case where the setting for monitoring the temperature information is enabled.

9. The image forming apparatus according to claim 1, further comprising:
a fan configured to be driven for air ventilation; and
a sensor configured to acquire temperature information,
wherein the controller is configured to cause the fan to execute predetermined driving processing, based on a temperature change in the temperature information satisfying a predetermined condition, and
wherein the predetermined driving processing is executed while the dew condensation removal processing is in progress.

10. The image forming apparatus according to claim 9, wherein the predetermined condition at least includes a condition that a temperature indicated by the temperature information is equal to or less than a predetermined temperature.

11. The image forming apparatus according to claim 1, wherein the controller is further configured to output a notification of condensation.

12. The image forming apparatus according to claim 1, wherein the dew condensation removal processing is executed by heating a dew condensation prevention heater for a predetermined period of time.

13. The image forming apparatus according to claim 1, wherein numerical information indicating a time until printing is to be started is arranged on the notification screen.

14. The image forming apparatus according to claim 1, wherein another button is arranged on the notification screen, and instructed execution of second image forming processing after completion of the dew condensation removal processing is preset in a case where the another button is selected.

15. The image forming apparatus according to claim 1, wherein the controller is configured to cause the display device to display a screen for specifying one of a plurality of modes including a first mode and a second mode,
wherein the image forming device is capable of executing first image forming processing in which image forming based on fax data is started in response to receipt of the fax data and executing second image forming processing different from the first image forming processing, and
wherein only a setting for prohibiting execution of the first image forming processing and storing the received fax data in the storage while the dew condensation removal processing is in progress is enabled in the first mode, and a setting for prohibiting execution of the first image forming processing and storing the received fax data in the storage while the dew condensation removal processing is in progress and a setting for causing the display device to display a notification screen in response to input of an instruction for executing the second image forming processing while the dew condensation removal processing is in progress are enabled in the second mode.

16. The image forming apparatus according to claim 15, wherein the second image forming processing includes processing for executing a copy job with which an image is formed based on an image scanned by a scanner.

17. The image forming apparatus according to claim 15, wherein the second image forming processing includes processing for executing a print job with which an image is formed based on received print data.

18. A method for controlling an image forming apparatus including an image forming device configured to form an image on a sheet, wherein the image forming device is capable of executing image forming processing, and a display device configured to display information, the method comprising:
performing dew condensation removal processing; and
causing the display device to display a notification screen, in response to input of an instruction for executing the image forming processing while the dew condensation removal processing is in progress,
wherein information about dew condensation, information about timing to start the image forming processing and at least one button are arranged on the notification screen, and the instruction for executing the image forming processing is canceled in a case where the at least one button is selected.

19. A non-transitory computer-readable storage medium storing a program to cause a controller to perform a method for controlling an image forming apparatus capable of receiving fax data, wherein the image forming apparatus includes an image forming device configured to form an image on a sheet, wherein the image forming device is capable of executing image forming processing, and a display device configured to display information, the method comprising:
performing dew condensation removal processing; and
causing the display device to display a notification screen, in response to input of an instruction for executing the image forming processing while the dew condensation removal processing is in progress,
wherein information about dew condensation, information about timing to start the image forming processing and at least one button are arranged on the notification screen, and the instruction for executing the image forming processing is canceled in a case where the at least one button is selected.

* * * * *